US012812597B2

(12) United States Patent
Xu et al.

(10) Patent No.: US 12,812,597 B2
(45) Date of Patent: Nov. 24, 2026

(54) PAGING FALSE ALARM MITIGATION AT A USER EQUIPMENT

(71) Applicant: Apple Inc., Cupertino, CA (US)

(72) Inventors: Fangli Xu, Beijing (CN); Dawei Zhang, Saratoga, CA (US); Haijing Hu, Los Gatos, CA (US); Murtaza A. Shikari, Mountain View, CA (US); Sarma V. Vangala, Campbell, CA (US); Sethuraman Gurumoorthy, San Ramon, CA (US); Srirang A. Lovlekar, Fremont, CA (US); Wei Zeng, Saratoga, CA (US); Yuchul Kim, San Jose, CA (US); Yuqin Chen, Beijing (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 295 days.

(21) Appl. No.: 18/601,315

(22) Filed: Mar. 11, 2024

(65) Prior Publication Data

US 2024/0214990 A1 Jun. 27, 2024

Related U.S. Application Data

(63) Continuation of application No. 17/593,678, filed as application No. PCT/CN2020/103259 on Jul. 21, 2020, now Pat. No. 12,015,994.

(51) Int. Cl.

| | |
|---|---|
| ***H04W 68/02*** | (2009.01) |
| ***H04W 68/06*** | (2009.01) |
| ***H04W 76/27*** | (2018.01) |

(52) U.S. Cl.

CPC .......... *H04W 68/02* (2013.01); *H04W 68/06* (2013.01); *H04W 76/27* (2018.02)

(58) Field of Classification Search

CPC ..... H04W 68/00; H04W 68/02; H04W 68/06; H04W 76/27; Y02D 30/70

See application file for complete search history.

(56) References Cited

U.S. PATENT DOCUMENTS

| | | | | |
|---|---|---|---|---|
| 10,694,492 | B2 * | 6/2020 | Fujishiro | H04W 76/28 |
| 12,289,787 | B2 * | 4/2025 | Islam | H04B 7/0695 |
| 2008/0182596 | A1 | 7/2008 | Wang et al. | |
| 2009/0061851 | A1 | 3/2009 | Kitazoe | |
| 2013/0194998 | A1 | 8/2013 | Susitaival et al. | |

(Continued)

FOREIGN PATENT DOCUMENTS

| | | |
|---|---|---|
| CN | 103052156 | 4/2013 |
| CN | 105208640 | 12/2015 |

(Continued)

*Primary Examiner* — Siu M Lee

(74) *Attorney, Agent, or Firm* — Fay Kaplun & Marcin, LLP

(57) ABSTRACT

A user equipment (UE) operates in a network. The UE receives, from the network, a paging area comprising a plurality of cells of the network. When the UE is in one of a radio resource control (RRC) inactive state or RRC idle state with respect to the network, the UE transmits a message to a first cell of the paging area based on the UE moving into a first coverage area of the first cell from a second coverage area of a second cell of the paging area. The UE then monitors the first cell for a page from the network.

20 Claims, 6 Drawing Sheets

(56) References Cited

U.S. PATENT DOCUMENTS

| | | | |
|---|---|---|---|
| 2015/0163639 A1 | 6/2015 | Kilpatrick, II et al. | |
| 2015/0208366 A1* | 7/2015 | Papasakellariou .... | H04L 1/1812 370/311 |
| 2015/0289229 A1 | 10/2015 | Ahluwalia et al. | |
| 2018/0332561 A1 | 11/2018 | Da Silva et al. | |
| 2019/0174571 A1 | 6/2019 | Deenoo et al. | |
| 2020/0084747 A1 | 3/2020 | Hong | |
| 2020/0178206 A1 | 6/2020 | Turtinen et al. | |
| 2020/0205121 A1 | 6/2020 | Yang | |
| 2021/0127355 A1* | 4/2021 | Gonzalez .............. | H04W 68/02 |
| 2021/0306986 A1 | 9/2021 | Takahashi et al. | |
| 2021/0345455 A1 | 11/2021 | Kodali et al. | |
| 2021/0392614 A1 | 12/2021 | Sakhnini et al. | |
| 2021/0410216 A1 | 12/2021 | Liu et al. | |
| 2022/0159617 A1* | 5/2022 | Shih .................... | H04W 68/005 |
| 2023/0007624 A1 | 1/2023 | Murray et al. | |
| 2023/0189209 A1* | 6/2023 | Jung ..................... | H04W 76/28 370/329 |

FOREIGN PATENT DOCUMENTS

| | | |
|---|---|---|
| CN | 108702732 | 10/2018 |
| CN | 109923913 | 6/2019 |
| CN | 110754121 | 2/2020 |
| CN | 110999438 | 4/2020 |
| WO | 2017/173158 | 10/2017 |
| WO | 2020033363 | 2/2019 |
| WO | 2019036933 | 2/2020 |

* cited by examiner

PAGING FALSE ALARM MITIGATION AT A USER EQUIPMENT

BACKGROUND

In 5G new radio (NR) wireless communications, a user equipment (UE) may enter a radio resource control (RRC) Idle mode or an RRC Inactive mode at various times to optimize power consumption at the UE. When the UE is in the RRC Idle mode, the UE does not exchange any data with the 5G NR network. The UE switches to an RRC connected mode by establishing a connection with a next generation NodeB (gNB) of the 5G NR network to exchange data with the network. If there is no activity at the UE for a period of time, the UE can suspend its RRC session by moving to the RRC Inactive mode, during which a minimal amount of data is exchanged with the 5G NR network.

One type of information that a UE may receive while in an RRC Idle or Inactive mode is paging transmissions. Paging transmissions may notify the UE that the network has data or messages (e.g., short messages) for the UE (e.g., voice call, system information changes, earthquake and tsunami warning system (ETWS), commercial mobile alert service (CMAS) indications, etc.). Paging messages may be sent to the UE over a paging control channel (PCCH) and short messages may be sent to the UE over a physical downlink control channel (PDCCH). To receive a paging message, the UE may monitor one or more paging occasion (PO) on the PDCCH for each paging discontinuous reception (DRX) cycle.

There are two types of paging areas: a core network (CN) initiated paging area and a radio access network (RAN) initiated paging area. In the CN-initiated paging area, an access and mobility management function (AMF) of the 5G network may assign each UE a registration area during a non-access stratum (NAS) registration procedure when the UE is initially in an RRC Idle state. The registration area may be defined as a set of non-overlapping tracking areas, each of which includes one or more cells (gNBs) that cover a geographical area. In the RAN-initiated paging area, a UE in the RRC Inactive state may be configured by the last serving gNB with a RAN-based notification area (RNA). The RNA can cover one or more cells and may be contained within the CN registration area discussed above.

For a UE to receive a paging message, the UE receives and demodulate the PDCCH, blindly decodes the PDCCH, receives and demodulates the physical downlink shared channel (PDSCH), decodes the PDSCH, and processes the paging message. The power consumption of the UE increases with an increased number of received false alarm paging messages. Such false alarms may occur due to the fact that multiple UEs share the same PO in a given area and, as such, a given UE may receive a paging message not intended for it. The larger the paging area, the more of a chance that false alarms will occur since the number of UEs increase as the paging area increases. The network may attempt a paging transmission multiple times to reduce the paging signaling overhead. This procedure may include the network beginning with a small paging area and increasing the size of the paging area with each subsequent paging attempt if no paging response is received for a given attempt.

SUMMARY

Some exemplary embodiments are related to a method performed by a user equipment (UE) operating in a network. The method includes receiving, from the network, a paging area comprising a plurality of cells of the network, when the UE is in one of a radio resource control (RRC) inactive state or RRC idle state with respect to the network, transmitting a message to a first cell of the paging area based on the UE moving into a first coverage area of the first cell from a second coverage area of a second cell of the paging area and monitoring the first cell for a page from the network.

Other exemplary embodiments are related to a user equipment (UE) having a transceiver and a processor. The processor is configured to receive, from a network, a paging area comprising a plurality of cells of the network and, when the UE is in one of a radio resource control (RRC) inactive state or RRC idle state with respect to the network, generate a message to be transmitted a first cell of the paging area based on the UE moving into a first coverage area of the first cell from a second coverage area of a second cell of the paging area. The transceiver is configured to transmit the message to the first cell.

Still further exemplary embodiments are related to a method performed by a user equipment (UE) in a radio resource control (RRC) connected state with a cell of a network. The method includes transmitting a message including a mobility state of the UE to the cell, wherein the mobility state comprises one of a moving state or a stationary state, transitioning to one of a RRC Inactive state or an RRC Idle state with respect to the network and monitoring one or more cells of the network for a page.

Additional exemplary embodiments are related to a user equipment (UE) having a transceiver and a processor. The transceiver is configured to connect to one or more cells of a network. The processor is configured to generate, when the UE is in a radio resource control connected state with the network, a message including a mobility state of the UE, wherein the mobility state comprises one of a moving state or a stationary state, transition the UE to one of a RRC Inactive state or an RRC Idle state with respect to the network and monitoring one or more cells of the network for a page.

DETAILED DESCRIPTION

Figure 1:
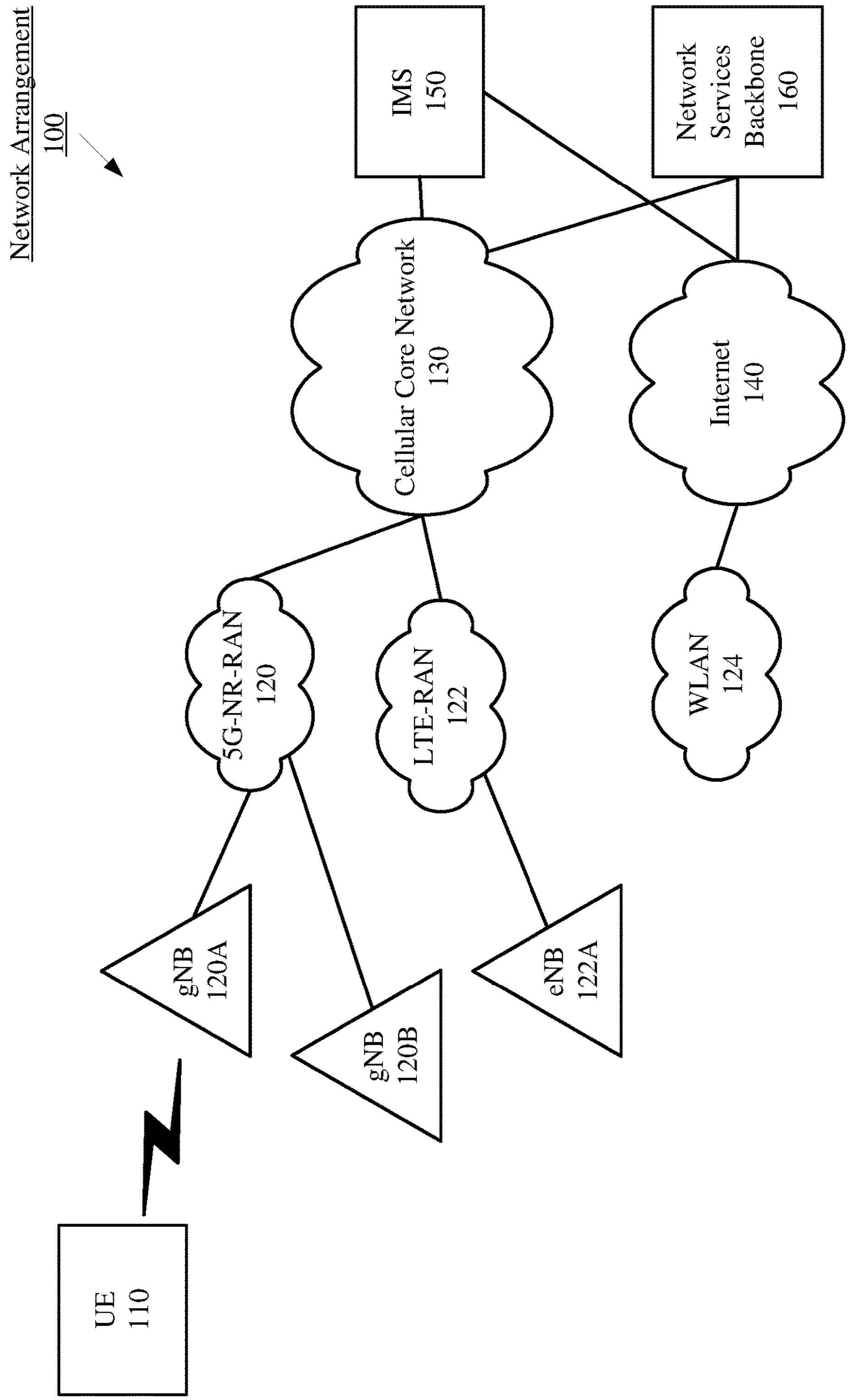
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments describe a device, system and method to reduce or eliminate false alarm paging messages received by a user equipment (UE).

The exemplary embodiments are described with regard to a UE. However, the use of a UE is merely for illustrative purposes. The exemplary embodiments may be utilized with any electronic component that may establish a connection with a network and is configured with the hardware, software, and/or firmware to exchange information and data with the network. Therefore, the UE as described herein is used to represent any electronic component.

The exemplary embodiments are also described with regard to a network that includes 5G new radio NR radio access technology (RAT). However, in some embodiments, the network may also include other cellular access networks (e.g., a Long-Term Evolution (LTE) RAT, a legacy RAT, etc.) and/or non-cellular access networks (e.g., 802.XX networks, WiFi, etc.), even though the following description will focus primarily on a 5G NR RAT.

As noted above, an increase in the number of false alarm paging messages received by a UE will increase power consumption at the UE. The paging area optimization described above where the paging area is increased if a response is not received is inefficient for various reasons. Firstly, paging latency is increased due to the various transmission attempts of the same paging message. Additionally, the smaller paging areas are not driven by any meaningful information regarding a UE moving route.

According to exemplary embodiments, the UE may provide information to the 5G NR network regarding the UE's movement to improve the accuracy of the reduced paging area described above. In some exemplary embodiments, this information may include the latest cell (gNB) on which the UE is camped prior to switching to an RRC Inactive or Idle state. In some exemplary embodiments, the UE may provide moving route information to the 5G NR network. Based on the information provided by the UE, the network may select which cell or cells should be used to forward the paging message to the UE.

Another issue that increases the number of false alarm paging messages received by a UE is the numerous UEs monitoring the same paging occasion (PO) in a given area. As noted above, the more UEs monitoring the PO, the greater the chance that one or more of those UEs process a paging message not intended for that UE.

According to some exemplary embodiments, the 5G NR network may configure the discontinuous reception (DRX) cycle during which a UE actively monitors for a paging message. As such, different UEs may be configured with different DRX cycles during which the UEs should monitor the PDCCH for a paging signal. The number of UEs monitoring the same PO is, therefore, reduced.

FIG. 1 shows an exemplary network arrangement 100 according to various exemplary embodiments. The exemplary network arrangement 100 includes a UE 110. It should be noted that any number of UE may be used in the network arrangement 100. Those skilled in the art will understand that the UE 110 may alternatively be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UE that are equipped with the appropriate cellular chip set. The WLAN 124 may include any type of wireless local area network (WiFi, Hot Spot, IEEE 802.11x networks, etc.).

The UE 110 may connect to the 5G NR-RAN 120 via the gNB 120A and/or the gNB 120B. Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
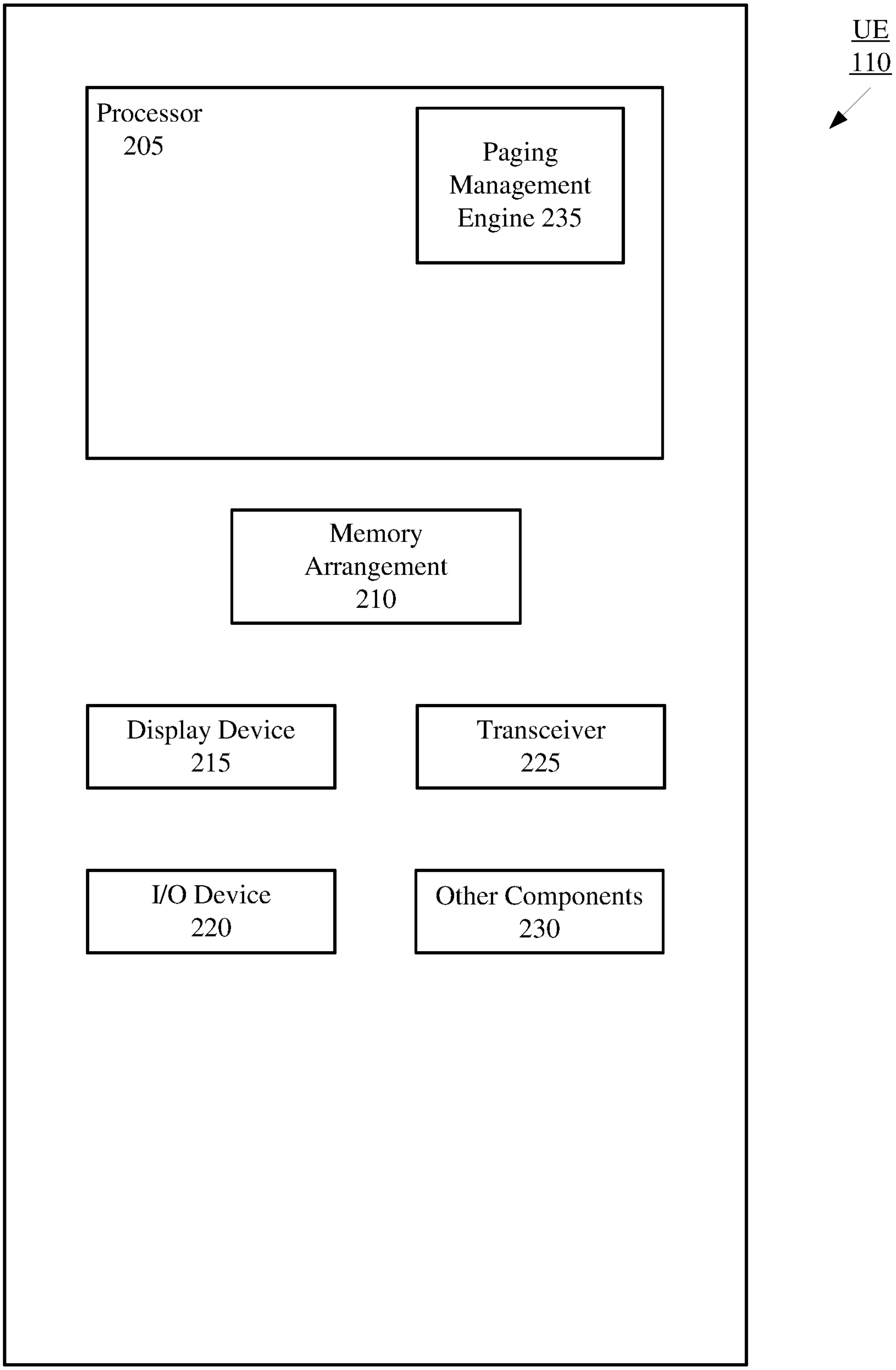
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, one or more antenna panels, etc. For example, the UE 110 may be coupled to an industrial device via one or more ports.

The processor 205 may be configured to execute a plurality of engines of the UE 110. For example, the engines may include a paging management engine 235. The paging management engine 235 may perform various operations related to paging reception such as, for example, processing a paging message, notifying the network 100 of the UE's mobility, etc.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UE, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3:
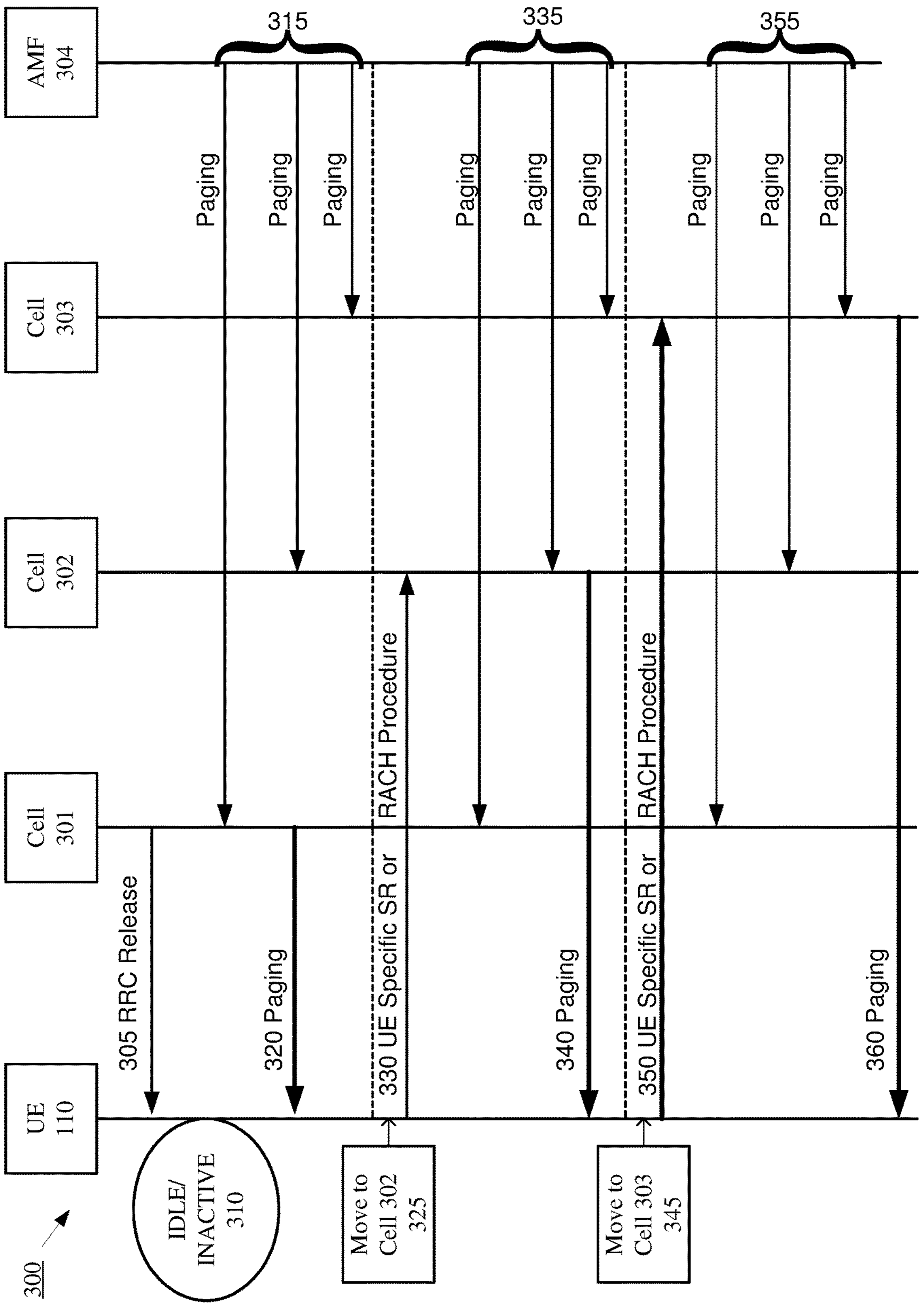
FIG. 3 shows a signaling diagram illustrating a first paging procedure according to various exemplary embodiments.

FIG. 3 shows a signaling diagram 300 illustrating a first paging procedure according to various exemplary embodiments. In the exemplary embodiment of FIG. 3, the network uses information about which cell the UE 110 was last camped on to target paging transmissions and reduce paging false alarms. The components represented in FIG. 3 include the UE 110, network cells 301-303 and access and mobility management function (AMF) 304. It should be understood that UE 110 may represent any UE. The network cells 301-303 may be, for example, gNB 122A, gNB 122B and another gNB associated with the 5G NR RAN 120. The AMF 304 may be considered a functionality implemented by the core network 130. Generally, the AMF 304 is responsible for connection and mobility management tasks (e.g., UE handovers between gNBs). In addition, the AMF 304 may be responsible for providing paging information to the appropriate gNBs for the gNBs to transmit the pages over the air (OTA).

In the example of FIG. 3, it may be considered that the paging area for the UE 110 includes the cells 301-303. This means that when there is a page for UE 110, the AMF 304 will forward the page to each of the cells in the paging area, e.g., cells 301-303. As will be described in greater detail below, the UE 110 may send notifications as the UE 110 moves from coverage area to coverage area of the cells 301-303 of the paging area. The UE 110 may be made aware of the cells in the paging area to which the UE 110 is to send notifications based on configuration information provided to the UE via RRC signaling or NAS signaling.

Further, it should be considered that in the scenario of FIG. 3, the UE 110 is not in a connected state with the network (e.g., the UE 110 is in an RRC Idle state or an RRC Inactive state) when the pages are transmitted. For example, when the page is transmitted by the corresponding cell 301-303 at 320, 340 or 360, the UE 110 will not be in a connected state. Those skilled in the art will understand that, for example, if the UE 110 receives the page from cell 301 at 320, the UE 110 will likely transition to a connected state to receive the data that is associated with the page. However, for the purposes of the signaling diagram 300, it should be considered that the UE 110 is not in a connected state when the pages are to be transmitted by the network.

As illustrated in FIG. 3, at 305 the UE 110 receives an RRC release signal from the cell 301 on which the UE 110 is currently camped. This will cause the UE 110 to switch to an RRC Idle or RRC Inactive state at 310. At 315, the AMF 304 of the core network 130 has a page for the UE 110 and sends a paging transmission to all of the cells 301-303 in the paging area for the UE 110. However, in this exemplary embodiment, at 320, only the cell on which the UE was last camped (e.g., cell 301) will transmit the page.

It should be understood that when the page is only transmitted by cell 301, the UEs that are camped on cells 302 and 303 will not receive the page that is not intended for those other UEs (e.g., because it is intended for UE 110), thereby preventing the other UEs from a receiving a paging false alarm. Thus, by intelligently selecting which cell should transmit the page for the UE 110, multiple paging false alarms are avoided.

At 325, the UE 110 moves to the coverage area of another cell (e.g., cell 302). To ensure that the network is aware of the movement of the UE to a different cell, the UE 110, at 330, may transmit a UE-specific scheduling request (SR) to or initiate a random access channel (RACH) procedure with the cell 302. As a result, the network is now aware that the UE 110 is in the coverage area of cell 302. Thus, when the AMF 304 sends a paging transmission at 335 to the cells 301-303 of the paging area for the UE 110, only the cell 302 will transmit the page at 440. Similar to the scenario discussed above, the UEs that are monitoring POs of cells 301 and 303 will not receive a paging false alarm related to a page for UE 110 because those cells 301 and 303 will not transmit the page.

Similarly, at 345 the UE 110 moves to the coverage area of another cell (e.g., cell 303). Again, to ensure that the network is aware of the movement of the UE 110, at 350, the UE 110 transmits a UE-specific SR to or initiates a RACH procedure with the cell 303. As a result, the network is now aware that the UE 110 has moved to cell 303. Thus, when the AMF 304 sends a paging transmission at 355 to all of the cells 301-303 of the paging area for the UE 110, only the cell 303 transmits the page at 360. Again, this will reduce the number UEs that erroneously receive the paging transmission intended for the UE 110 because the network is aware of the cell on which the UE 110 is camped and targets the transmission of the paging message to the UE 110 via that cell.

Figure 4:
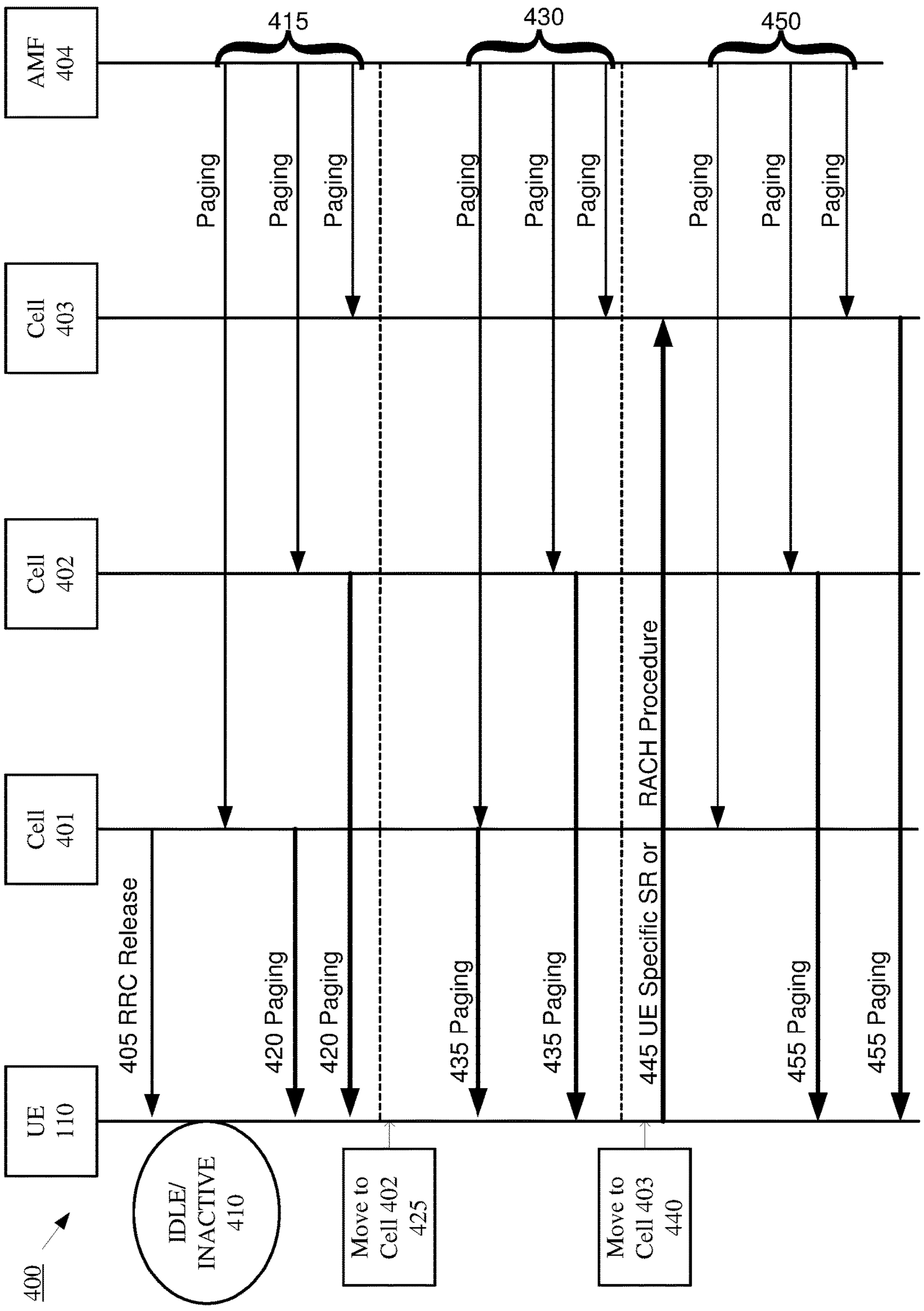
FIG. 4 shows a signaling diagram illustrating a second paging procedure according to various exemplary embodiments.

FIG. 4 shows a signaling diagram 400 illustrating a second paging procedure according to various exemplary embodiments. The process depicted in FIG. 4 is similar to that of FIG. 3. However, in the example of FIG. 4, the UE 110 does not inform the network of every move to a new cell. Instead, the UE 110 reports movement for every N cell changes. In the example of signaling diagram 400, instead of reporting every cell change to the network, the UE 110 may report movement every N=2 cell changes. Given this information, the network will forward a paging message to the UE 110 via the last cell on which the UE 110 was camped as well as neighboring cell (s) as will be described in greater detail below. The network may configure the value of N for the UE 110, e.g., via RRC signaling or NAS signaling.

In signaling diagram 400, the components may be considered to be similar to the components as described above with respect to signaling diagram 300, including UE 110, cells 401-403 and AMF 404. In addition, it may be considered that cell 401 has cell 402 as a neighbor, cell 402 has cells 401 and 403 as neighbors and cell 403 has cell 402 as a neighbor.

As illustrated in FIG. 4, at 405 the UE 110 receives an RRC release signal from the cell 401 on which the UE 110 is currently camped. This causes the UE 110 to switch to an RRC Idle or RRC Inactive state at 410. At 415, the AMF 404 of the core network 130 sends a paging transmission to all of the cells 401-403 of the paging area for the UE 110. In this example, since the UE 110 was last camped on cell 401, the page is transmitted, at 420, by the cell 401 and its neighbor cell 402.

At 425, it may be considered that the UE 110 moves to the coverage area of another cell (e.g., cell 402). However, in contrast to the signaling diagram 300 of FIG. 3, the UE 110 does not notify the network of this movement. As described above, in this example, the UE 110 has been configured to report a cell change to the network for every N=2 cell changes. Since the change at 425 is a first cell change (e.g., N=1), the UE 110 will not report the cell change. At 430, the AMF 304 sends a paging transmission to all of the cells 401-403 of the paging area of the UE 110. Since no movement information has been relayed to the network, at 435, the cells 401 and 402 will transmit the page. Since the UE 110 has been configured to report its movement for every N cell change, the network is aware that the UE 110 is within N cells of the last known cell on which the UE 110 was camped. As such, forwarding the paging transmission via cell 401 (the last camped cell) and cell 402 (the neighbor cell) achieves a reduction in the paging area (cell 403 does not transmit the page) while also reducing power consumption associated with reporting the movement of the UE 110.

At 440, the UE moves to the coverage area of another cell (e.g., cell 403). As noted above, in this example, the UE 110 is configured report its movement every N=2 cell changes. Since this is the second cell change, at 445, the UE 110 transmits a UE-specific SR to or initiates a RACH procedure with the cell 403 to indicate the cell change to the network. As a result, the network is now aware that the UE 110 has moved to the coverage area of cell 403. Thus, when the AMF 404 sends a paging transmission at 450 to all of the cells 401-403 of the paging area for UE 110, only cell 403 and the neighbor cell 402 transmit the page at 455.

Figure 5:
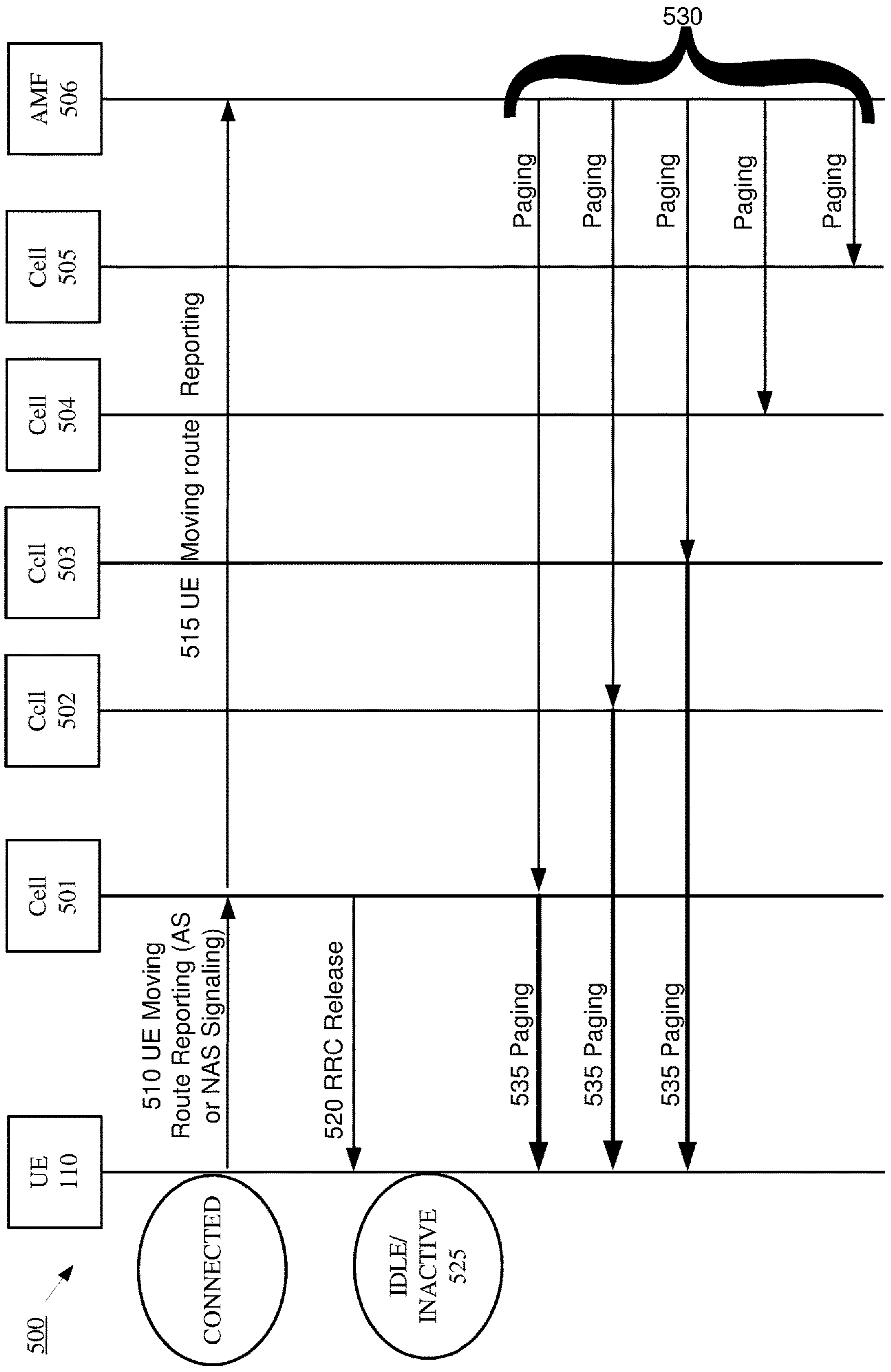
FIG. 5 shows a signaling diagram illustrating a third paging procedure according to various exemplary embodiments.

FIG. 5 shows a signaling diagram 500 illustrating a third paging procedure according to various exemplary embodiments. In this example, it may be considered that the current paging area for the UE 110 includes five (5) cells 501-505. In this exemplary embodiment, the UE 110 will provide the network with information regarding movement of the UE 110. The network may then use this movement information to select one or more cells on which to transmit the page. The movement information may be, for example, a route that the UE 110 is going to travel, e.g., a route of a train from point A to point B, a driving route from a user's home to the user's office, etc. The movement information may include any information suitable to inform the network of possible cells for which the UE 110 may enter a coverage area. To provide a further example, if, while in the connected state, the UE 110 is moving east from one cell to the next, the movement information may allow the network to eliminate cells further west or remote from a projected path of the UE 110 when determining which cells should be used to forward the paging transmission to the UE 110.

It should be understood that there may be many manners for the UE 110 to determine movement or potential movement information and the manner in which the UE 110 determines the movement information is outside the scope of this disclosure. For the purposes of signaling diagram 500, it may be considered that the UE 110 has determined the movement information and is reporting that movement information to the network.

In the signaling diagram 500, the UE 110 is initially in an RRC Connected state. Prior to switching to an RRC Idle or RRC Inactive state, the UE 110, at 510, transmits the movement information to the currently camped cell, e.g., cell 501, via, for example AS or NAS signaling. At 515, the cell 501 forwards the movement information to the AMF 506. At 520, the UE 110 receives an RRC release signal from the cell 501 and switches to an RRC Idle or RRC Inactive state at 525.

At a later time, the AMF 506 has a page for the UE 110. As described above, the AMF 506 has previously received the movement information for the UE 110. The AMF 506 (or another component of the core network 130) may use this movement information to select a set of cells that matches the likely route of the UE 110. In the example of signaling diagram 500, the AMF 506 may determine that the subset of cells of the paging area for the UE 110 based on the movement information includes cells 501-503. However, cells 504 and 505 of the paging area are excluded from this subset. At 530, the AMF 506 of the core network 130 sends a paging transmission to the cells of the subset, e.g., cells 501-503. At 535, the cells 501-503 that received the paging information from the AMF 506 may transmit the page.

In other exemplary embodiments, the determination of the subset of cells may be transmitted to the individual cells such that each cell understands whether the cell should transmit a page for a particular UE. In these exemplary embodiments, at 530 the AMF 506 may send the paging transmission to all the cells of the paging area for the UE 110, e.g., cells 501-505. Then, at 535, only the cells 501-503 of the subset as determined by the information received by the cells for the UE 110 may transmit the page.

Figure 6:
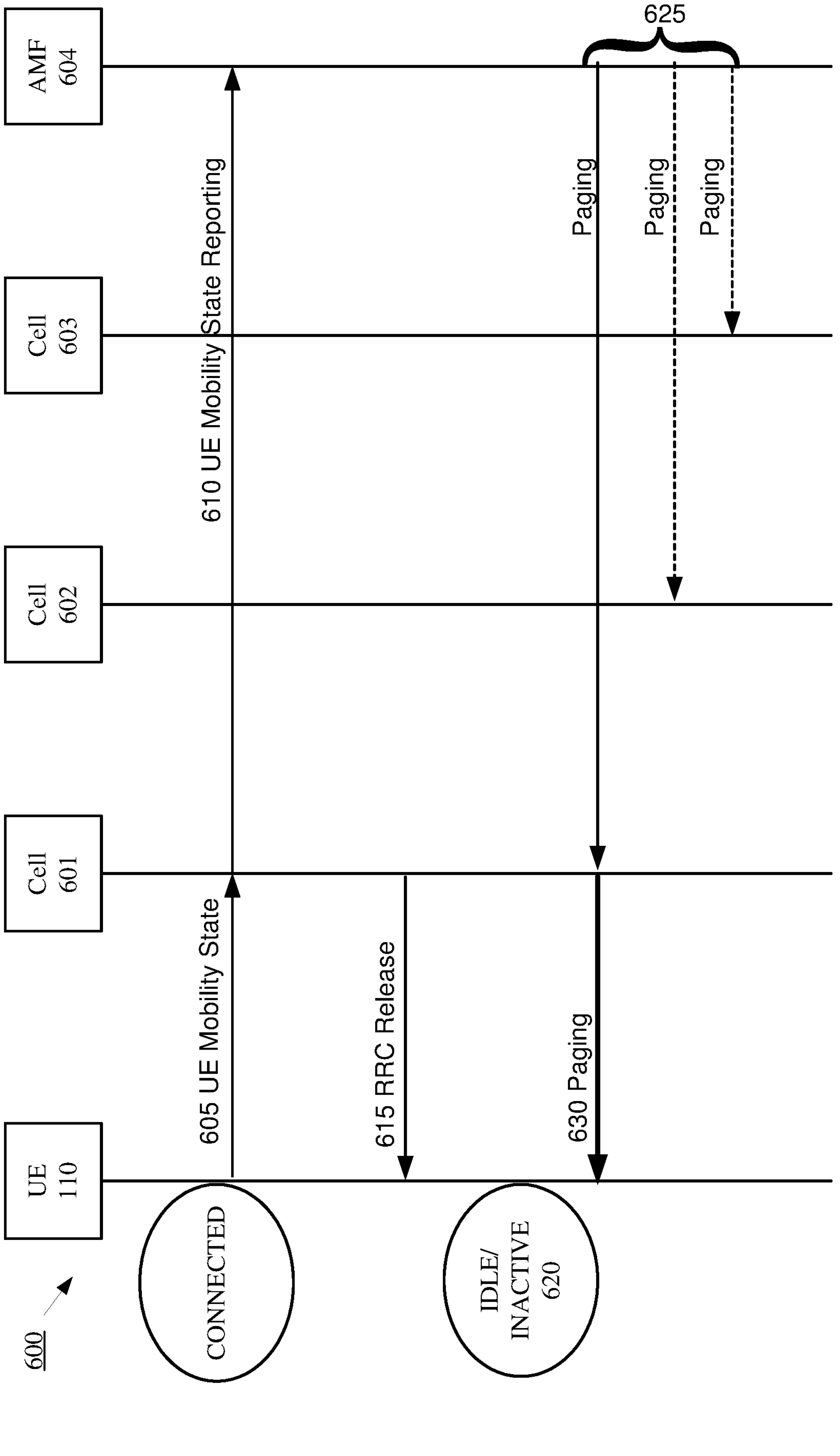
FIG. 6 shows a signaling diagram illustrating a fourth paging procedure according to various exemplary embodiments.

FIG. 6 shows a signaling diagram 600 illustrating a fourth paging procedure according to various exemplary embodiments. Again, the signaling diagram 600 includes the UE 110, network cells 601-603 and AMF 604. In the example of signaling diagram 600, the UE 110 provides a mobility state to the network and the network may then use this mobility state to select the cells of the paging area with which to page the UE 110.

In the signaling diagram 600, the UE 110 is initially in an RRC Connected state. Prior to switching to an RRC Idle or RRC Inactive state, the UE 110, at 605, transmits an indication of a mobility state of the UE 110 to the currently camped cell (e.g., cell 601). The indication may be transmitted, for example, via NAS or AS signaling. The mobility state may include any number of states, for example, stationary, moving, etc. At 610, the cell 601 forwards the mobility information the AMF 604. At 615, the UE 110 receives an RRC release signal from the currently camped cell 601 and the UE 110 switches to an RRC Idle or RRC Inactive state at 620.

When the UE 110 reports the mobility state in 605, the UE 110 may also report the movement information as described above with respect to signaling diagram 500. The movement information may be sent when the mobility state is moving. The procedure for paging the UE 110 when it is in the moving mobility state may be the same as described above with reference to any of signaling diagrams 300-500.

However, the signaling diagram 600 focuses on the scenario where the UE 110 has reported a stationary mobility state. At 625, the AMF 504 of the core network 130 sends a paging transmission to all of the cells of the paging area for the UE 110. However, because the UE 110 has reported that the mobility state is stationary, only the last cell to which the UE 110 was connected will transmit the page. In the example of signaling diagram 600, the last connected cell is cell 601. Thus, at 630, the cell 601 transmits the page.

The above exemplary embodiments may reduce the number of false alarm paging transmissions received and processed by UEs by reducing the size of the paging area. In some embodiments, the network 100 may alternatively reduce the number of UEs monitoring the same PO by modifying the DRX cycles of the UEs. As a result of the modifications, the number of UEs monitoring a given PO is reduced due to the different times that the UEs are monitoring the PDCCH.

In some embodiments, the network 100 may configure the UEs 110 such that different UEs use one of three different types of paging DRX cycles: 1.) a default DRX cycle configured by RRC; 2.) a UE-specific DRX cycle configured by the non-access stratum (NAS) signaling; or 3.) a RAN DRX cycle configured by RRC.

In some embodiments, the network 100 may alternatively configure a UE-specific offset to determine a UE-specific paging frame (PF) and PO. The PO may be based on the network configuration and the UE ID. To reduce the number of UEs monitoring a PO, the network 100 may configure an offset for each UE so that when the UE calculates its PF and PO, the UE adds the network configured offset specific to that UE. This results in a distribution of a plurality of UEs among the POs.

In some embodiments, the network 100 may alternatively directly configure where each UE will receive the paging. That is, the network 100 may configure an entirely new paging DRX configuration via NAS or access stratum (AS) signaling. In some embodiments, the new paging DRX configuration would no longer based on the UE ID, but instead on the network configuration. For example, the network 100 can base this new paging DRX configuration on the number of registered UEs to achieve a better distribution of UEs among the POs.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A processor configured to:

process, based on signals received from a network component of a network during a non-access stratum (NAS) process, a paging discontinuous reception (DRX) cycle configuration comprising a user equipment (UE)-specific paging DRX cycle, wherein the paging DRX cycle configuration is based on all of a plurality of UEs in a paging area not monitoring a same paging occasion (PO); and monitor POs according to the paging DRX cycle configuration.

2. The processor of claim 1, wherein the paging DRX cycle configuration comprises a UE-specific offset to be used by the processor to determine the POs and a paging frame (PF) to monitor.

3. The processor of claim 1, wherein the paging DRX cycle configuration is based on a number of registered UEs in the paging area.

4. The processor of claim 1, wherein a core network (CN) of the network initiates paging.

5. The processor of claim 1, wherein a radio access network (RAN) initiates paging.

6. The processor of claim 1, wherein the processor is further configured to:

generate, for transmission to the network component, a message comprising a UE-specific scheduling request (SR).

7. The processor of claim 1, wherein the processor is further configured to:

initiate a UE-triggered random access channel (RACH) procedure.

8. A user equipment (UE), comprising:

a transceiver configured to communicate with a network; and a processor communicatively coupled to the transceiver and configured to:

process, based on signals received from a network component of the network during a non-access stratum (NAS) process, a paging discontinuous reception (DRX) cycle configuration comprising a UE-specific paging DRX cycle, wherein the paging DRX cycle configuration is based on all of a plurality of UEs in a paging area not monitoring a same paging occasion (PO); and monitor POs according to the paging DRX cycle configuration.

9. The UE of claim 8, wherein the paging DRX cycle configuration comprises a UE-specific offset to be used by the UE to determine the POs and a paging frame (PF) to monitor.

10. The UE of claim 8, wherein a core network (CN) of the network initiates paging.

11. The UE of claim 8, wherein a radio access network (RAN) initiates paging.

12. The UE of claim 8, wherein the processor is further configured to:

generate, for transmission to the network component, a message comprising a UE-specific scheduling request (SR).

13. The UE of claim 8, wherein the processor is further configured to:

initiate a UE-triggered random access channel (RACH) procedure.

14. A method, comprising:

at a user equipment (UE):

receiving, from a network component of the network during a non-access stratum (NAS) process, a paging discontinuous reception (DRX) cycle configuration comprising a UE-specific paging DRX cycle, wherein the paging DRX cycle configuration is based on all of a plurality of UEs in a paging area not monitoring a same paging occasion (PO); and monitoring POs according to the paging DRX cycle configuration.

15. The method of claim 14, wherein the paging DRX cycle configuration comprises a UE-specific offset to be used by the processor to determine the POs and a paging frame (PF) to monitor.

16. The method of claim 14, wherein the paging DRX cycle configuration is based on a number of registered UEs in the paging area.

17. The method of claim 14, wherein a core network (CN) of the network initiates paging.

18. The method of claim 14, wherein a radio access network (RAN) initiates paging.

19. The method of claim 14, further comprising:

transmitting a message comprising a UE-specific scheduling request (SR).

20. The method of claim 14, further comprising:

initiating a UE-triggered random access channel (RACH) procedure.

* * * * *